United States Patent
Youn

(10) Patent No.: US 9,138,723 B2
(45) Date of Patent: Sep. 22, 2015

(54) METHOD OF MANUFACTURING CATALYST COATING SOLUTION AND CATALYST BODY USING THE SAME

(75) Inventor: Young Kee Youn, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 626 days.

(21) Appl. No.: 13/316,543

(22) Filed: Dec. 11, 2011

(65) Prior Publication Data

US 2013/0072379 A1 Mar. 21, 2013

(30) Foreign Application Priority Data

Sep. 21, 2011 (KR) .................. 10-2011-0095204

(51) Int. Cl.
| | |
|---|---|
| *B01J 21/04* | (2006.01) |
| *B01J 21/06* | (2006.01) |
| *B01J 37/02* | (2006.01) |
| *B01J 37/04* | (2006.01) |
| *B01J 35/00* | (2006.01) |
| *B01J 23/10* | (2006.01) |
| *B01J 23/28* | (2006.01) |
| *B01J 23/30* | (2006.01) |
| *B01J 23/38* | (2006.01) |
| *B01J 35/02* | (2006.01) |
| *B01J 37/00* | (2006.01) |
| B01D 53/94 | (2006.01) |
| B01J 33/00 | (2006.01) |

(52) U.S. Cl.
CPC .............. *B01J 21/063* (2013.01); *B01J 21/066* (2013.01); *B01J 23/10* (2013.01); *B01J 23/28* (2013.01); *B01J 23/30* (2013.01); *B01J 23/38* (2013.01); *B01J 35/0006* (2013.01); *B01J 35/023* (2013.01); *B01J 37/0036* (2013.01); *B01J 37/0215* (2013.01); *B01J 37/0244* (2013.01); *B01J 37/04* (2013.01); *B01D 53/944* (2013.01); *B01D 2255/20707* (2013.01); *B01D 2255/20715* (2013.01); *B01D 2255/20769* (2013.01); *B01D 2255/20776* (2013.01); *B01D 2255/9022* (2013.01); *B01D 2258/012* (2013.01); *B01J 33/00* (2013.01)

(58) Field of Classification Search
USPC .......... 502/300, 304, 350, 322, 323, 355, 351
See application file for complete search history.

(56) References Cited

U.S. PATENT DOCUMENTS

| | | | |
|---|---|---|---|
| 7,431,749 B2 | 10/2008 | Kim et al. | |
| 2005/0074374 A1* | 4/2005 | Ogura | ........................... 422/180 |
| 2007/0003456 A1* | 1/2007 | Tsuji et al. | .................... 422/177 |

(Continued)

FOREIGN PATENT DOCUMENTS

| | | |
|---|---|---|
| EP | 0 960 649 A2 | 12/1999 |
| JP | 4-358539 A | 12/1992 |
| JP | 9-155205 A | 6/1997 |
| KR | 1998-085132 A | 12/1998 |
| KR | 2002-0061324 A | 7/2002 |

(Continued)

*Primary Examiner* — Kaj K Olsen
*Assistant Examiner* — Pritesh Darji
(74) *Attorney, Agent, or Firm* — Morgan, Lewis & Bockius LLP

(57) ABSTRACT

A method of preparing a catalyst coating solution may realize high purification performance by preventing the active surface of a catalyst from being reduced, and may greatly improve the durability of a catalyst by preventing soot from directly coming into contact with a catalyst layer containing a precious metal so that the catalyst layer can continuously exhibit proper purification performance. A method of manufacturing a catalyst body using the catalyst coating solution, and a catalyst body manufactured by the method are also described.

8 Claims, 2 Drawing Sheets

(56) References Cited

U.S. PATENT DOCUMENTS

2010/0048392 A1* 2/2010 Okawara et al. ............. 502/328
2011/0044871 A1 2/2011 Maletz et al.

FOREIGN PATENT DOCUMENTS

KR 10-2008-0077977 A 8/2008
WO WO 2010/083315 A2 7/2010

* cited by examiner

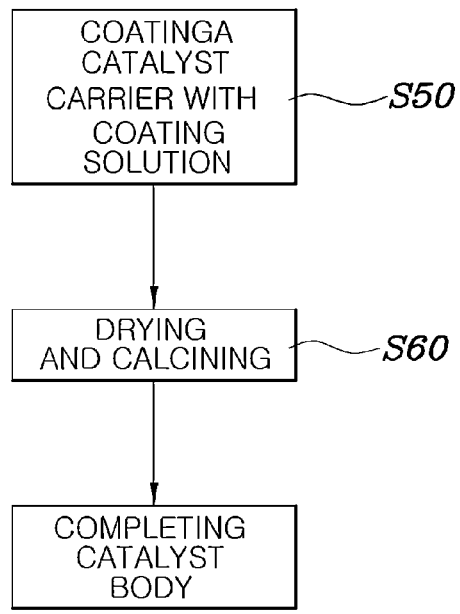
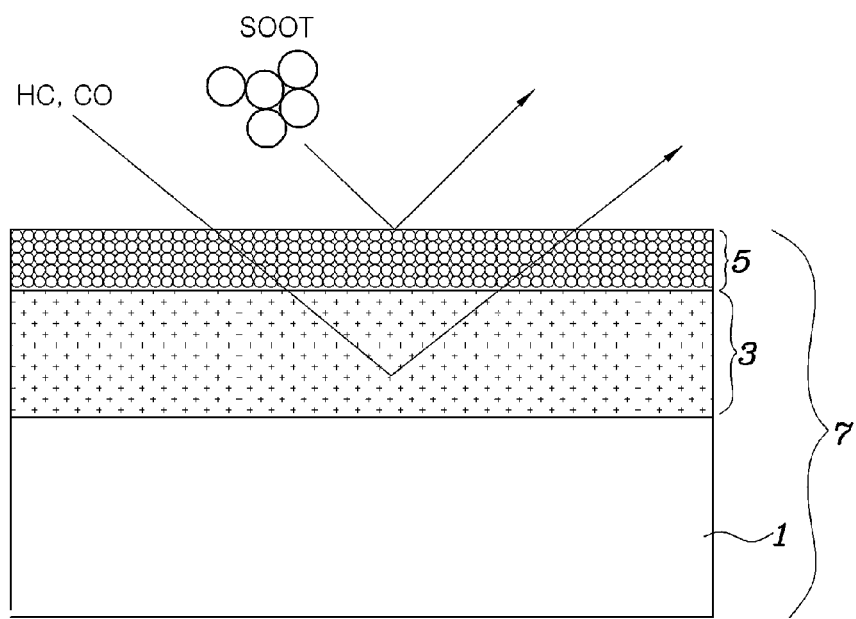

METHOD OF MANUFACTURING CATALYST COATING SOLUTION AND CATALYST BODY USING THE SAME

CROSS-REFERENCE TO RELATED APPLICATION

The present application claims priority of Korean Patent Application Number 10-2011-0095204 filed Sep. 21, 2011, the entire contents of which application is incorporated herein for all purposes by this reference.

BACKGROUND OF INVENTION

1. Field of Invention

The present invention relates to a method of preparing a catalyst coating solution, a method of manufacturing a catalyst body using the catalyst coating solution and a catalyst body manufactured by the method. More particularly, the present invention relates to a technology for improving the durability of a diesel oxidation catalyst.

2. Description of Related Art

Catalytic converters are used to purify harmful substances included in exhaust gas discharged from an engine and are provided with a catalyst body that supports a precious metal. This catalyst body is characterized in that its purification performance, durability and the like are very sensitive to heat.

Particularly, when soot included in exhaust gas directly comes into contact with a catalyst containing precious metal, the precious metal included in the catalyst is sintered when the soot is oxidized and generates heat, so that there is a tendency for the durability of the catalyst to deteriorate.

Conventionally, methods that have been used in order to improve the durability of a catalyst to heat include a method of forming a catalyst using a metal oxide having high heat resistance, such as lanthanum-alumina, zirconium-ceria or the like, which are prepared by adding a heterogeneous component to an oxide (matrix), a method of strongly bonding a matrix with a precious metal by increasing the calcination temperature during a process of fixing metal oxide powder with a precious metal, and the like.

However, the above conventional methods of improving the durability of a catalyst are problematic in that catalytic performance inevitably deteriorates because the active surface of a catalyst is reduced.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method of preparing a catalyst coating solution, which can realize high purification performance by preventing the active surface of a catalyst from being reduced, and which can greatly improve the durability of a catalyst by preventing soot from directly coming into contact with a catalyst layer containing a precious metal so that the catalyst layer can continuously exhibit proper purification performance, a method of manufacturing a catalyst body using the catalyst coating solution, and a catalyst body manufactured by the method.

Various aspects of the present invention provide for a method of preparing a catalyst coating solution, comprising the steps of: milling a slurry solution prepared by dissolving an alumina-base metal oxide as a powdered catalyst in a solvent in a concentration of 50~400 g/L to pulverize the alumina-based metal oxide such that the ratio of alumina-based metal oxide particles having a size of 12 μm or less to total alumina-based metal oxide particles is 90% or more; milling a slurry solution prepared by dissolving a soot removing metal oxide as a powdered catalyst in a solvent in a concentration of 50~400 g/L to pulverize the soot removing metal oxide such that the ratio of soot removing metal oxide particles having a size of 20 μm or less to the total soot removing metal oxide particles is 90% or more; and mixing the slurry solution containing the pulverized alumina-based metal oxide with the slurry solution containing the pulverized soot removing metal oxide while adding water to obtain a mixed slurry solution containing the alumina-based metal oxide and soot removing metal oxide as solids in a concentration of 5~100 g/L such that the weight ratio of the alumina-based metal oxide to the soot removing metal oxide is 40/60~20/80.

Another aspect of the present invention provides a method of preparing a catalyst coating solution, comprising the steps of: milling a slurry solution prepared by dissolving an alumina-base metal oxide as a powdered catalyst in a solvent in a concentration of 50~200 g/L to pulverize the alumina-based metal oxide such that the ratio of alumina-based metal oxide particles having a size of 12 μm or less to total alumina-based metal oxide particles is 90% or more; and continuously adding a soot removing metal oxide as a powdered catalyst to the slurry solution containing the pulverized alumina-based metal oxide in a concentration of 50~400 g/L and simultaneously milling the slurry solution to pulverize the soot removing metal oxide such that the ratio of soot removing metal oxide particles having a size of 20 μm or less to total soot removing metal oxide particles is 90% or more, and adding water to obtain a mixed slurry solution containing the alumina-based metal oxide and soot removing metal oxide as solids in a concentration of 5~100 g/L such that the weight ratio of the alumina-based metal oxide to the soot removing metal oxide is 40/60~20/80.

Still another aspect of the present invention provides a method of manufacturing a catalyst body, comprising the steps of: dipping a carrier supporting a catalyst into the catalyst coating solution prepared by the method previously described to coat the carrier with the catalyst coating solution; and drying and calcining the carrier coated with the catalyst coating solution.

Still another aspect of the present invention provides a catalyst body, manufactured by the above method, wherein the catalyst body is formed by disposing the coated catalyst layer formed in the coating step and the calcining step on a catalyst layer containing precious metal such that the former lays on top of the latter.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a flowchart showing an exemplary method of manufacturing a catalyst body according to the present invention.

FIG. 4 is a view showing an exemplary structure and function of the catalyst body according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
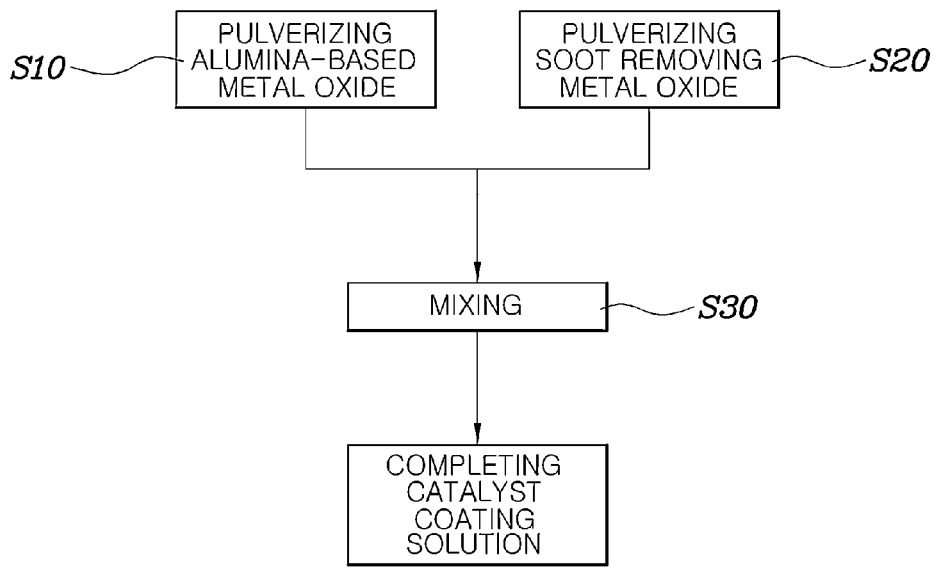
FIGS. 1 and 2 are flowcharts showing exemplary methods of preparing a catalyst coating solution according to the present invention.

Referring to FIG. 1, a method of preparing a catalyst coating solution according to various embodiments of the present invention includes the steps of: milling a slurry solution prepared by dissolving an alumina-base metal oxide as a powdered catalyst in a solvent in a concentration of 50~400 g/L to pulverize the alumina-based metal oxide such that the ratio of alumina-based metal oxide particles having a size of 12 μm or less to total alumina-based metal oxide particles is 90% or more (S10); milling a slurry solution prepared by dissolving a soot removing metal oxide as a powdered catalyst in a solvent in a concentration of 50~400 g/L to pulverize the soot removing metal oxide such that the ratio of soot removing metal oxide particles having a size of 20 μm or less to total soot removing metal oxide particles is 90% or more (S20); and mixing the slurry solution containing the pulverized alumina-based metal oxide with the slurry solution containing the pulverized soot removing metal oxide while adding water to obtain a mixed slurry solution containing the alumina-based metal oxide and soot removing metal oxide as solids in a concentration of 5~100 g/L such that the weight ratio of the alumina-based metal oxide to the soot removing metal oxide is 40/60~20/80 (S30).

A commonly used method is used to pulverize the alumina-based metal oxide. That is, the alumina-based metal oxide is pulverized by ball-milling the slurry solution while adjusting the particle size of slurry, and the soot removing metal oxide is also pulverized by ball-milling the slurry solution while adjusting the particle size of the slurry.

Here, the alumina-based metal oxide includes at least one selected from alumina ($Al_2O_3$) and cerium-aluminum composite oxide (($Ce.Al)_2O_3$), and the soot removing metal oxide includes at least one selected from titanium oxide ($TiO_2$), molybdenum oxide ($MoO_3$), tungsten oxide ($WO_3$) and zirconium oxide ($ZrO_2$).

That is, the catalyst coating solution prepared in this way is finally formed into the uppermost layer of a catalyst body, and is characterized in that it does not include a precious metal, such as platinum, palladium, rhodium or the like.

Figure 2:
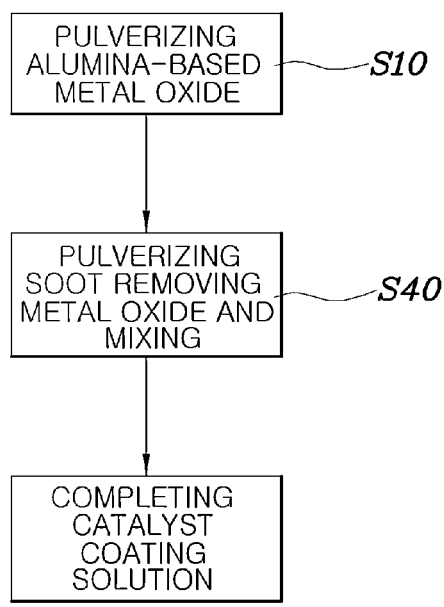

The above method of preparing a catalyst coating solution may be somewhat modified as shown in FIG. 2. That is, a method of preparing a catalyst coating solution according to various embodiments of the present invention includes the steps of: milling a slurry solution prepared by dissolving an alumina-base metal oxide as a powdered catalyst in a solvent in a concentration of 50~200 g/L to pulverize the alumina-based metal oxide such that the ratio of alumina-based metal oxide particles having a size of 12 μm or less to total alumina-based metal oxide particles is 90% or more (S10); and continuously adding a soot removing metal oxide as a powdered catalyst to the slurry solution containing the pulverized alumina-based metal oxide in a concentration of 50~400 g/L and simultaneously milling the slurry solution to pulverize the soot removing metal oxide such that the ratio of soot removing metal oxide particles having a size of 20 μm or less to total soot removing metal oxide particles is 90% or more, and mixing the slurry solution containing the pulverized alumina-based metal oxide with the slurry solution containing the pulverized soot removing metal oxide while adding water to obtain a mixed slurry solution containing the alumina-based metal oxide and soot removing metal oxide as solids in a concentration of 5~100 g/L such that the weight ratio of the alumina-based metal oxide to the soot removing metal oxide is 40/60~20/80 (S40).

That is, in this method, unlike in the method of FIG. 1, the step of pulverizing the soot removing metal oxide and the step of mixing the soot removing metal oxide with the alumina-based metal oxide are performed at the same time. This method can provide the desired catalytic performance if the particle sizes of the alumina-based metal oxide and the soot removing metal oxide are satisfied to some degree.

The catalyst body of the present invention can be manufactured by coating a catalyst with the catalyst coating solution prepared by the above method. A method of manufacturing a catalyst body according to the present invention, as shown in FIG. 3, includes the steps of: dipping a carrier supporting a catalyst into the catalyst coating solution prepared by the method of any one of claims 1 to 6 to coat the carrier with the catalyst coating solution (S50); and drying and calcining the carrier coated with the catalyst coating solution (S60).

The coated catalyst layer formed in the coating step (S50) and calcining step (S60) is formed such that the weight of the coated catalyst layer to the apparent volume of the carrier is 40 g/L or less. When the weight of the coated catalyst layer is more than 40 g/L, there is a problem in that the ability of CO and HC to be purified is deteriorated.

The catalyst body manufactured by the above method has the structure shown in FIG. 4. That is, this catalyst body is configured such that the coated catalyst layer formed in the coating step (S50) and calcining step (S60) is disposed on a catalyst layer containing a precious metal such that the former lays on top of the latter.

That is, the catalyst body of the present invention can be realized by applying the coated catalyst layer onto any type of a catalyst layer such as a single layer, a multiple layer or the like.

Since the coated catalyst layer, as shown in FIG. 4, passes gas components, such as HC, CO and the like, without passing soot, it functions to prevent soot from directly coming into contact with a precious metal included in a catalyst layer disposed beneath the coated catalyst layer and to selectively filter out soot.

As described above, since the coated catalyst layer can prevent soot from coming into direct contact with the precious metal included in the catalyst layer, it is possible to prevent a precious metal from being rapidly sintered by heat when soot is oxidized and emits heat, so that the active surface of the catalyst layer including the precious metal can be maintained even when a vehicle travels for a long period of time, thereby improving the durability of a catalyst.

Further, gas components, such as HC, CO and the like, in exhaust gas are purified by a catalyst layer disposed beneath the coated catalyst layer, and soot is treated by the coated catalyst layer, thus improving the performance of a catalyst.

As described above, according to the present invention, high purification performance can be realized by preventing the active surface of a catalyst from being reduced, and the durability of a catalyst can be greatly improved by preventing soot from coming into direct contact with a catalyst layer containing a precious metal to enable the catalyst layer not to easily deteriorate and to continuously exhibit proper purification performance.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of preparing a catalyst coating solution, comprising:
    milling a slurry solution prepared by dissolving an alumina-based metal oxide as a powdered catalyst in a solvent in a concentration of 50~400 g/L to pulverize the alumina-based metal oxide such that a ratio of alumina-based metal oxide particles having a size of 12 μm or less to total alumina-based metal oxide particles is 90% or more;
    milling a slurry solution prepared by dissolving a soot removing metal oxide as a powdered catalyst in a solvent in a concentration of 50~400 g/L to pulverize the soot removing metal oxide such that a ratio of soot removing metal oxide particles having a size of 20 μm or less to total soot removing metal oxide particles is 90% or more; and
    mixing the slurry solution containing the pulverized alumina-based metal oxide with the slurry solution containing the pulverized soot removing metal oxide while adding water to obtain a mixed slurry solution containing the alumina-based metal oxide and soot removing metal oxide as solids in a concentration of 5~100 g/L such that the weight ratio of the alumina-based metal oxide to the soot removing metal oxide is 40/60~20/80.

2. The method of preparing a catalyst coating solution according to claim 1, wherein the alumina-based metal oxide includes at least one selected from alumina ($Al_2O_3$) and cerium-aluminum composite oxide (($Ce.Al)_2O_3$).

3. The method of preparing a catalyst coating solution according to claim 1, wherein the soot removing metal oxide includes at least one selected from titanium oxide ($TiO_2$), molybdenum oxide ($MoO_3$), tungsten oxide ($WO_3$) and zirconium oxide ($ZrO_2$).

4. A method of preparing a catalyst coating solution, comprising the steps of:
    milling a slurry solution prepared by dissolving an alumina-based metal oxide as a powdered catalyst in a solvent in a concentration of 50~200 g/L to pulverize the alumina-based metal oxide such that a ratio of alumina-based metal oxide particles having a size of 12 μm or less to total alumina-based metal oxide particles is 90% or more; and
    continuously adding a soot removing metal oxide as a powdered catalyst to the slurry solution containing the pulverized alumina-based metal oxide in a concentration of 50~400 g/L and simultaneously milling the slurry solution to pulverize the soot removing metal oxide such that a ratio of soot removing metal oxide particles having a size of 20 μm or less to total soot removing metal oxide particles is 90% or more, and adding water to obtain a mixed slurry solution containing the alumina-based metal oxide and soot removing metal oxide as solids in a concentration of 5~100 g/L such that the weight ratio of the alumina-based metal oxide to the soot removing metal oxide is 40/60~20/80.

5. The method of preparing a catalyst coating solution according to claim 4, wherein the alumina-based metal oxide includes at least one selected from alumina ($Al_2O_3$), cerium oxide ($CeO_2$) and cerium-zirconium composite oxide (($Ce.Zr)O_2$).

6. The method of preparing a catalyst coating solution according to claim 4, wherein the soot removing metal oxide includes at least one selected from titanium oxide ($TiO_2$), molybdenum oxide ($MoO_3$) and tungsten oxide ($WO_3$).

7. A method of manufacturing a catalyst body, comprising the steps of:
    dipping a carrier supporting a catalyst into the catalyst coating solution prepared by the method of claim 4 to coat the carrier with the catalyst coating solution; and
    drying and calcining the carrier coated with the catalyst coating solution.

8. The method of manufacturing a catalyst body according to claim 7, wherein the coated catalyst layer formed in the coating step and the calcining step is formed such that the amount of the coated catalyst layer to the volume of the carrier is 40 g/L or less.

* * * * *